United States Patent [19]

Hanada

[11] 4,203,652
[45] May 20, 1980

[54] BEAM SHAPING OPTICAL SYSTEM
[75] Inventor: Hiroshi Hanada, Yokohama, Japan
[73] Assignee: Canon Kabushiki Kaisha, Tokyo, Japan
[21] Appl. No.: 913,225
[22] Filed: Jun. 6, 1978

Related U.S. Application Data

[63] Continuation of Ser. No. 769,728, Feb. 17, 1977, abandoned.

[30] Foreign Application Priority Data

Feb. 15, 1977 [JP] Japan ................... 52-15341
Feb. 15, 1977 [JP] Japan ................... 52-15342
Feb. 15, 1977 [JP] Japan ................... 52-15343
Feb. 15, 1977 [JP] Japan ................... 52-15344

[51] Int. Cl.$^2$ .................. G02B 13/08; G02B 13/10
[52] U.S. Cl. ................... 350/182; 331/94.5 C; 350/181; 350/190
[58] Field of Search ............ 350/181, 182, 190; 331/94.5 H, 94.5 C

[56] References Cited

PUBLICATIONS

IBM Tech. Discl. Bulletin, vol. 19, No. 2, Jul. 1976, E. A. Cuningham, "Collimated . . . Lens".
IBM Tech. Discl. Bulletin, vol. 19, No. 5, Oct. 1976, J. C. Marinace, "Electrical . . . Lasers".

*Primary Examiner*—Paul A. Sacher
*Attorney, Agent, or Firm*—Fitzpatrick, Cella, Harper & Scinto

[57] ABSTRACT

This specification discloses a beam shaping optical system for treating the diverging beam emitted from the exit surface of a semiconductor laser. The beam from the semiconductor laser has different angles of divergence and different origins of divergence in directions orthogonal to each other. Such a beam may be collimated or efficiently treated into a circular spot light by the beam shaping optical system.

23 Claims, 30 Drawing Figures

BEAM SHAPING OPTICAL SYSTEM

This is a continuation of application Ser. No. 769,728 filed Feb. 17, 1977, and now abandoned.

BACKGROUND OF THE INVENTION

1. Field of the Invention

This invention relates to an optical system for shaping the diverging beam from the exit surface of a semiconductor laser.

2. Description of the Prior Art

In general, the beam emitted from a semiconductor laser known as the diode laser or the injection laser has different angles of divergence in directions orthogonal to each other. There are also semiconductor lasers which emit beams having different origins of divergence in the directions orthogonal to each other. It is impossible to treat such a semiconductor laser beam by the use of a rotation symmetry lens, namely, a lens having equal focal lengths in the directions orthogonal to each other, so that the beam may be collimated or made into a circular spot light.

SUMMARY OF THE INVENTION

It is therefore an object of the present invention to provide an optical system for treating the beam from a semiconductor laser.

According to the present invention, there is provided a beam shaping optical system for collimating the beam from a semiconductor which comprises a semiconductor laser element, the origin of divergence of the beam from the exit surface of the element lying at a position on a certain axis remote from the exit surface, the origin of divergence of the beam in a direction perpendicular to the joining surface lying at a position on the certain axis adjacent the exit surface, and an optical system having different focal lengths in directions orthogonal to each other, the optic axis of the optical system being coincident with the certain axis, the focal lengths being coincident with the origins of divergence, respectively.

The above object and other features of the present invention will become fully apparent from the following detailed description of numerous embodiments taken in conjunction with the accompanying drawings.

DESCRIPTION OF THE PREFERRED EMBODIMENTS

Figure 1A:
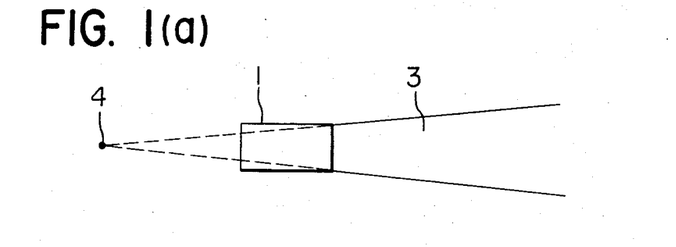
FIGS. 1(a) and 1(b) shows an example of the light emitting characteristic of a semiconductor laser.
Figure 1B:
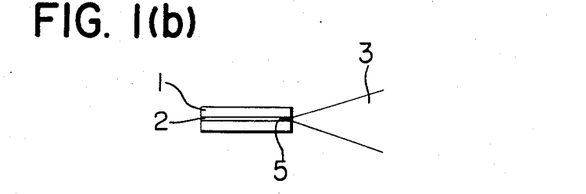

Referring to FIG. 1 which shows the diverging condition of the beam from a semiconductor laser, FIG. 1(a) is a view of the semiconductor laser as seen from above it, and FIG. 1(b) is a view of the semiconductor laser as seen from the lateral thereof. The semiconductor laser is designated by 1, and the joining surface thereof is denoted by 2. The beam from the exit surface of the semiconductor laser 1 is denoted by 3. The origin of divergence of the this beam in a direction parallel to the joining surface (hereinafter referred to as the lateral direction) is indicated by 4, and the origin of divergence of the beam in a direction perpendicular to the joining surface (hereinafter referred to as the vertical direction) is indicated by 5. These origins of divergence 4 and 5 lie at different positions on a common bisecting line of the angles of divergence in the vertical and the lateral direction, respectively. The origin of divergence 4 in the lateral direction lies at a position remote from the exit surface, while the origin of divergence 5 in the vertical direction lies adjacent the exit surface.

A rotation symmetry lens is not effective to treat such beam so as to become a parallel beam or a circular focused spot. Thus, it is impossible to make such beam into a parallel beam or a focused spot with respect both to the vertical and the lateral direction, by the use a rotation symmetry lens. The present invention is concerned with a beam shaping optical system for treating such a beam. According to the present invention, treatment of a beam having different origins of divergence in the vertical and the lateral direction is effected by an optical system having different focal lengths in the vertical and the lateral direction.

As the optical system having different focal lengths in the vertical and the lateral direction, there may occur to mind an optical system including at least one cylindrical system such as a cylindrical lens, a cylindrical concave mirror or a toric lens.

In the ensuing description, a cylindrical lens will be taken as an example for convenience of illustration. In addition, collimation of a beam and formation of the beam into a focused spot will be taken as an example of the beam treatment.

Collimation of the beam from a semiconductor laser will first be considered.

A simplest arrangement of the beam shaping optical system for collimating the beam from a semiconductor laser may be provided by disposing two cylindrical lenses such that their respective bus lines are orthogonal to each other on a common bisecting line of the two angles of divergence, thereby registering the respective focal points with the origins of divergence. It is also possible to collimate the beam from a semiconductor laser by the use of a cylindrical lens and a rotation symmetry lens. More specifically, with the aforementioned bisecting line as the optic axis, a cylindrical lens and a rotation symmetry lens are disposed on the optic axis so that one origin of divergence is made coincident with the other origin of divergence by the cylindrical lens, and by using said other origin of divergence as the focal point of the rotation symmetry lens, the beam from the semiconductor laser can be collimated. Such an embodiment is shown in FIG. 2.

Figure 2A:
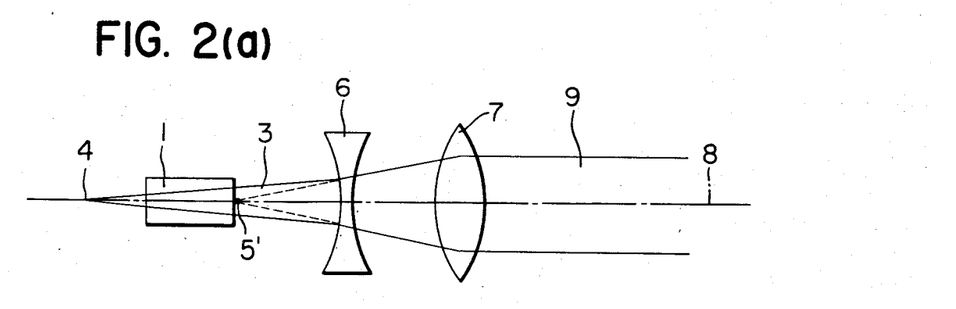
FIGS. 2(a) and 2(b) shows the arrangement of the optical system for collimating the beam from the semiconductor laser having the light emitting characteristic as shown in FIG. 1.
Figure 2B:
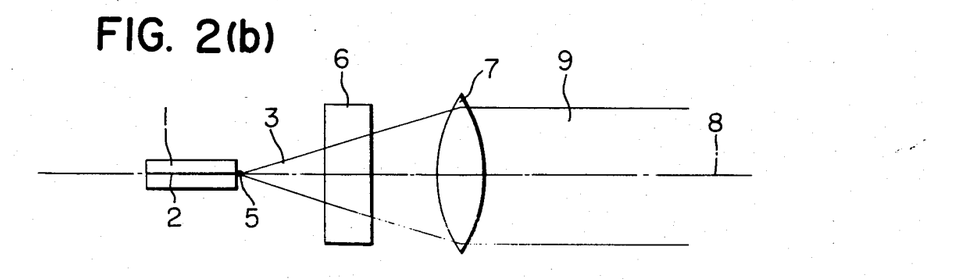

In FIG. 2, the cylindrical concave lens is designated by 6 and the rotation symmetry lens by 7. The cylindrical concave lens 6 is disposed with its bus line lying on the common bisecting line of the diverging beam 3 and being orthogonal to a plane parallel to the joining surface 2. In other words, the cylindrical concave lens 6 is disposed so as not to affect the divergence in the vertical direction but to affect the divergence in the lateral direction. By the cylindrical concave lens 6, the origin of lateral divergence 4 is moved to the position of the origin of vertical divergence 5. Therefore, a beam 9 parallel with respect both to the vertical and the lateral direction may be obtained by causing the rotation symmetry lens 7 to register its optic axis with the line 8 and to register its focal point with the origin of divergence 5.

Figure 3A:
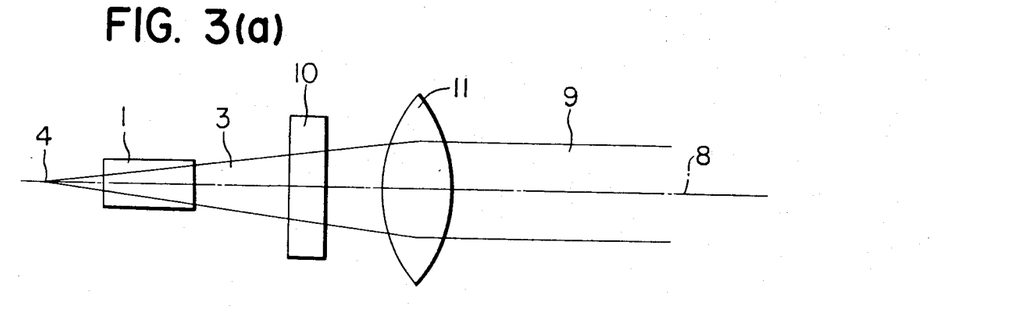
FIGS. 3(a) and 3(b) shows the arrangement of the collimating optical system according to a second embodiment.
Figure 3B:
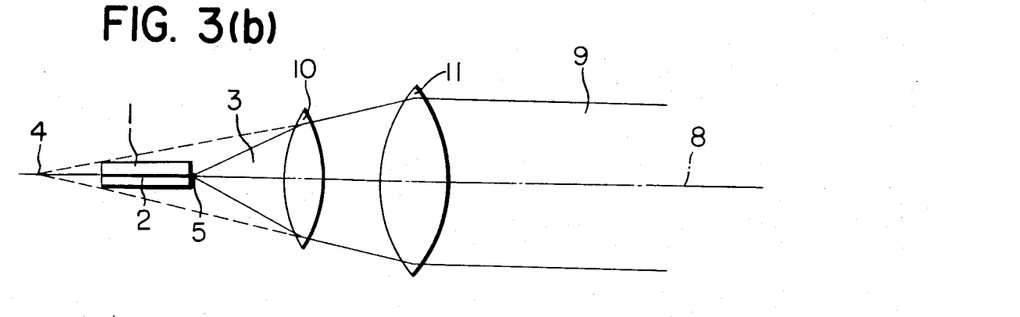

FIG. 3 shows an embodiment in which the origin of divergence 5 is moved into coincidence with the origin of divergence 4.

In this embodiment, a convex cylindrical lens 10 is disposed so as to have a refractive power in the vertical direction. This lens 10 causes the origin of vertical divergence 5 to be coincident with the origin of lateral divergence 4. A rotation symmetry lens 11 is disposed so that its focal point is coincident with the origin of divergence 4. Thus, there may be provided a beam 9 which is parallel with respect both to the vertical and the lateral direction.

Figure 4A:
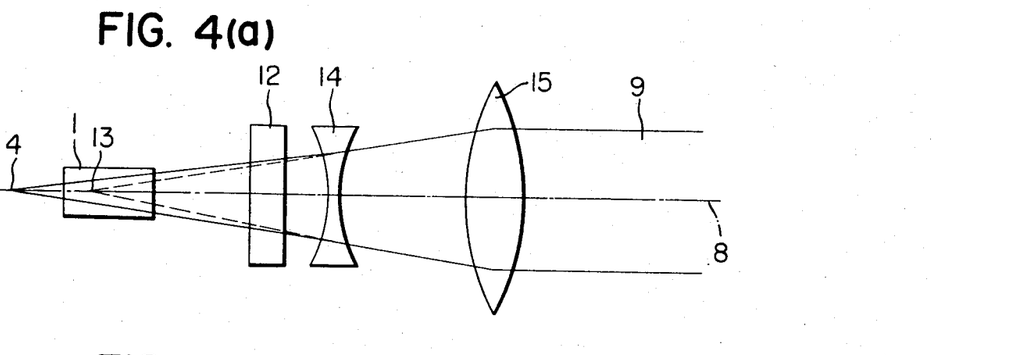
FIGS. 4(a) and 4(b) shows the optical arrangement of the collimating optical system according to a third embodiment.
Figure 4B:
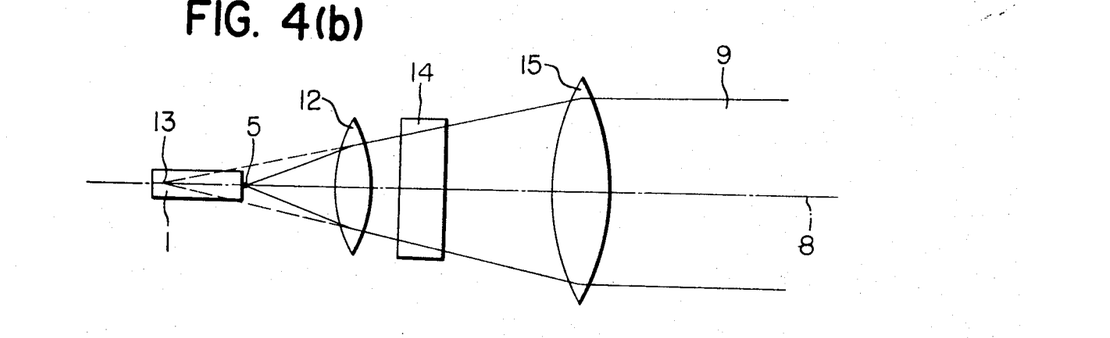

FIG. 4 shows an embodiment in which two cylindrical lenses having their bus lines orthogonal to each other are used to move both origins of divergence 4 and 5 into coincidence on a certain point, whereby the beam from a semiconductor laser may be collimated by a rotation symmetry lens having its focal point on said certain point.

Designated by 12 in FIG. 4 is a convex cylindrical lens for moving the origin of vertical divergence 5 to a midpoint 13 on the line 8 between the origin of vertical divergence 5 and the origin of lateral divergence 4. Denoted by 14 is a concave cylindrical lens for moving the origin of lateral divergence 4 to the midpoint 13, and 15 a rotation symmetry lens having its focal point coincident with the midpoint 13. By such arrangement, there may be provided a beam 9 which is parallel with respect both to the vertical and the lateral direction.

Figure 5A:
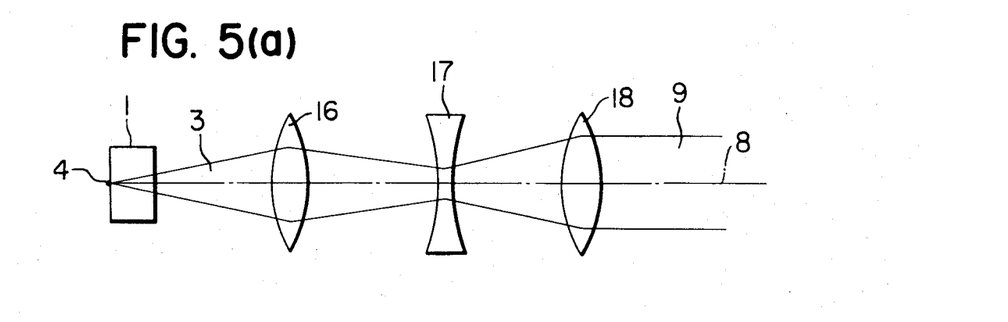
FIGS. 5(a) and 5(b) shows the optical arrangement of a fourth embodiment.
Figure 5B:
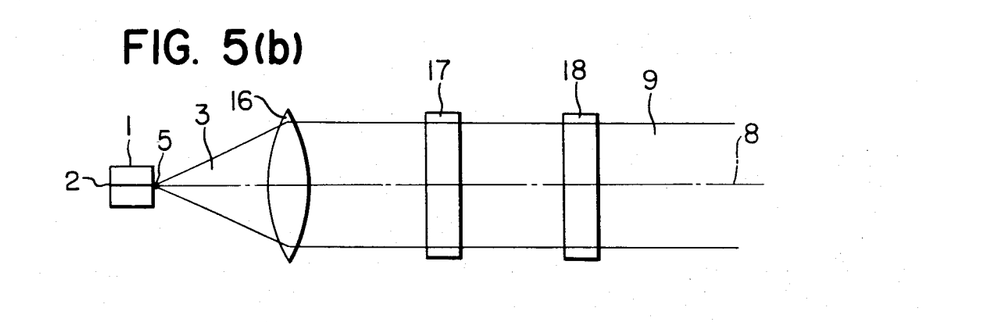
Figure 6A:
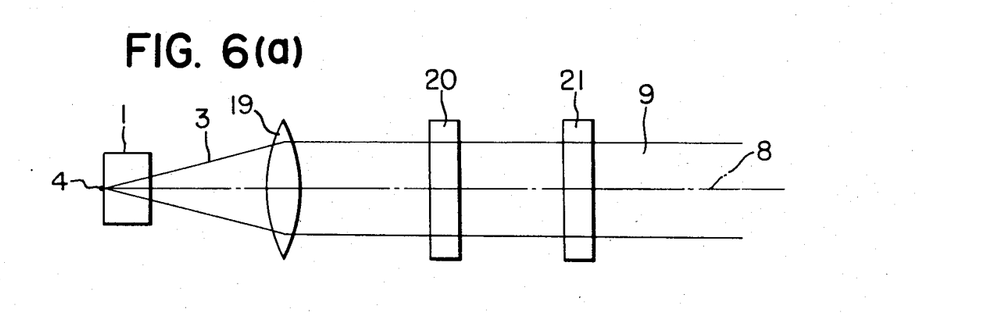
FIGS. 6(a) and 6(b) shows the optical arrangement of a fifth embodiment.
Figure 6B:
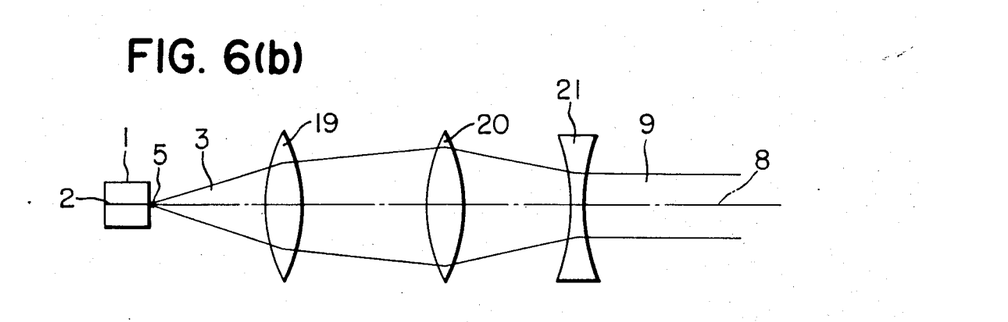

In the first to third embodiments shown in FIGS. 2 to 4, collimation of the beam is effected with respect to both directions by the rotation symmetry lens 7, 11 or 15, whereas FIGS. 5 and 6 show fourth and fifth embodiments in which a rotation symmetry lens is used to collimate the beam with respect to one direction while a cylindrical lens is used to collimate the beam with respect to the other direction.

Designated by 16 in FIG. 5 is the rotation symmetry lens having its focal point coincident with the origin of vertical divergence 5. Thus, by this rotation symmetry lens 16, the beam from the semiconductor laser is collimated with respect to the vertical direction. On the other hand, the origin of lateral divergence 4 lies at a position remote from the focal point of the rotation symmetry lens 16, so that the beam 3 is converged with respect to the lateral direction. By a cylindrical lens having its focal point at the point of convergence, the beam 3 is collimated with respect also to the lateral direction. With such arrangement however, the optical system can not be made compact and therefore, as shown in FIG. 5, a concave lens 17 is disposed behind the rotation symmetry lens 16. Disposed behind the concave lens 17 is a convex cylindrical lens 19. Thus, collimation with respect to the vertical direction is accomplished by the rotation symmetry lens 16 and collimation with respect to the lateral direction is accomplished by the rotation symmetry lens 16, the concave cylindrical lens 17 and the convex cylindrical lens 18.

FIG. 6 shows an embodiment which differs in arrangement from the fourth embodiment of FIG. 5. In FIG. 6, a rotation symmetry lens 19 is disposed with its focal point being coincident with the origin of lateral divergence 4. Thus, by this rotation symmetry lens 19, the lateral divergence of the beam 3 is collimated. On the other hand, with respect to the vertical direction, the beam 3 remains diverging because the origin of divergence 5 lies at a position closer than the focal point of the lens 19. This diverging beam is collimated by a convex 20 and a concave cylindrical lens 21.

With any of the above-described first to fifth embodiments, the beam from the semiconductor laser can be collimated with respect both to the vertical and the lateral direction.

Figure 7:
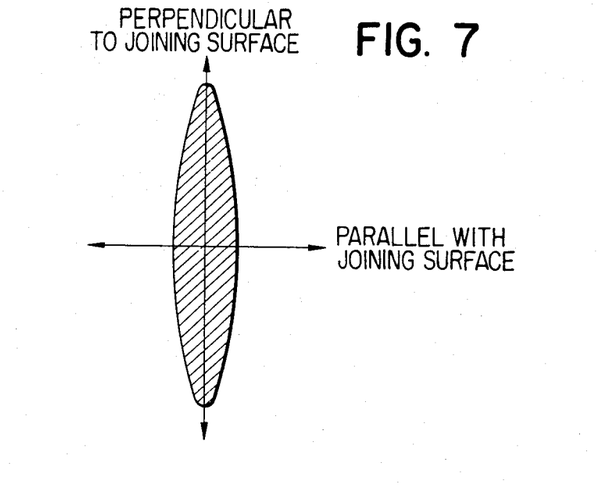
FIG. 7 shows a cross-section of the parallel beam from the collimating optical system according to any one of the first to fifth embodiments.

Sometimes, however, the parallel beam so provided takes an elliptical cross-sectional shape as shown in FIG. 7. Description will now be made of an optical system for changing such an elliptical cross-sectional shape of the beam to a predetermined cross-sectional shape. An axial rotation symmetry shape will be taken as the predetermined cross-sectional shape, because a case where such parallel beam is focused by a rotation symmetry lens is now under consideration.

Figure 8A:
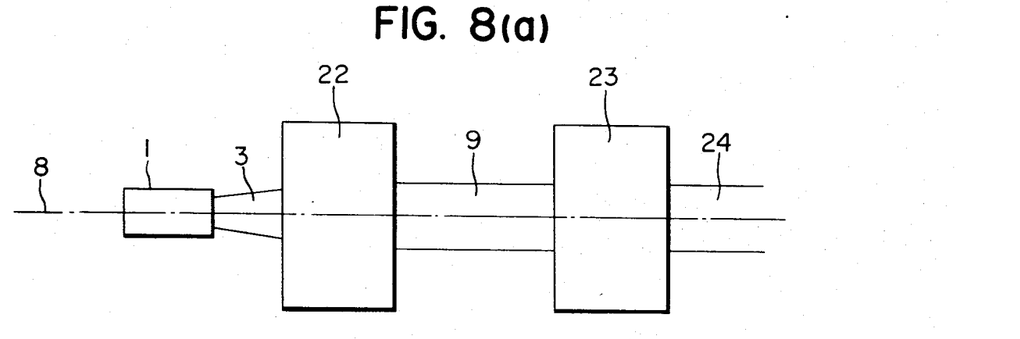
FIGS. 8(a) and 8(b) shows the optical arrangement of a sixth embodiment in which a rotation symmetry parallel beam may be provided.
Figure 8B:
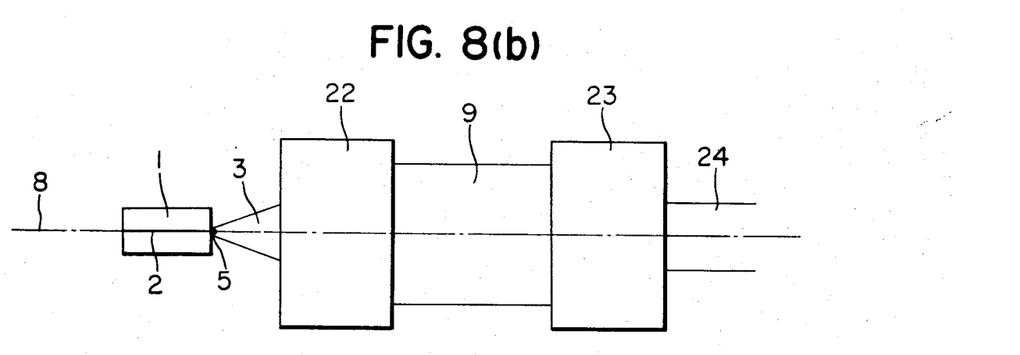

In FIG. 8, numeral 22 designates the optical system for collimating a semiconductor laser beam having different focal lengths in the vertical and the lateral direction. This optical system 22 may be any one of the embodiments previously described. Designated by 23 is an anamorphic afocal optical system. This anamorphic afocal optical system serves to change the beam widths, namely, to reduce or expand one beam width so as to become equal to the other beam width. In the embodiment of FIG. 8, the vertical beam width is reduced by the anamorphic afocal optical system 23 so as to become equal to the lateral beam width, thereby providing a beam 24 of rotation symmetry cross-section. As an alternative, two of such anamorphic afocal optical system may be disposed orthogonal to each other to change the beam widths in the two directions, for example, expand the lateral beam width and reduce the vertical beam width, thereby obtaining a mean beam width.

The anamorphic afocal optical system used in the embodiment of FIG. 8 may be either a prism anamorphic afocal optical system or a cylindrical anamorphic afocal optical system.

FIG. 7 shows a seventh embodiment which employs a prism anamorphic afocal optical system. Designated by 25 and 26 are convex cylindrical lenses disposed orthogonal to each other, and 27 is a rotation symmetry lens. The lateral width of the beam 3 from the semiconductor laser 1 is collimated by the cylindrical lens 26 and the rotation symmetry lens 27 while the vertical width of the beam is collimated by the cylindrical lens 25 and the rotation symmetry lens 27. The parallel beam 28 so provided enters a prism anamorphic afocal optical system 29 serving to reduce the beam width in the vertical direction. By this afocal system 29, the vertical beam width is reduced to provide a rotation symmetry parallel beam.

An example of the application of the FIG. 9 embodiment will be shown below.

EXAMPLE

Cylindrical glass rods of BK glass (refractive index: about 1.51) having diameter of 3 mm and 20 mm, respectively, were cut away or ground away at one side thereof, and then polished sufficiently to provide cylindrical lenses respectively having thicknesses of 1.5 mm and 3 mm and a length of 3 mm. A convex lens having a focal length of 10 mm, provided by a common lens, was used as the rotation symmetry lens.

Two simple prisms were used, each of which had a vertical angle of 35°. The combination of the two prisms can compress the beam to about 1/5.

Figure 9A:
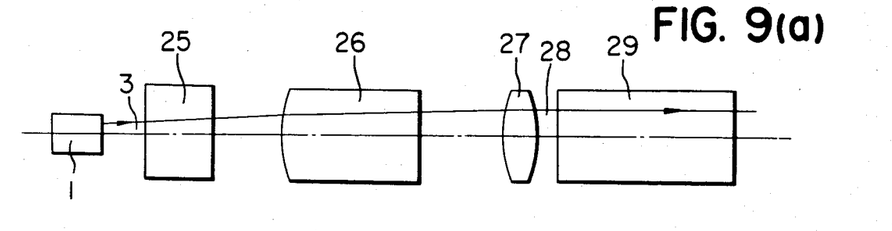
FIGS. 9(a) and 9(b) shows a further specific embodiment of the optical arrangement in which a rotation symmetry parallel beam may be provided.
Figure 9B:
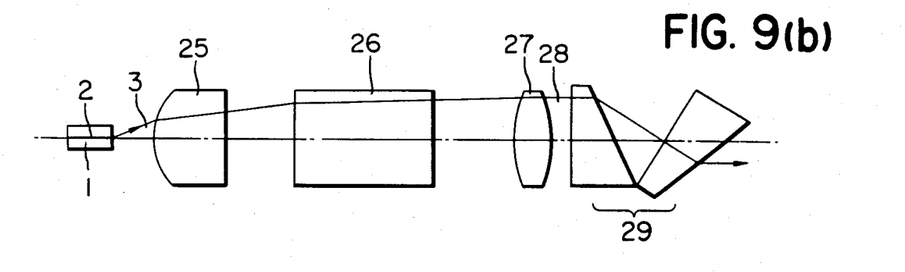

These elements were arranged in the manner as shown in FIG. 9. The spacings therebetween were: 1 mm between the semiconductor laser 1 and the cylindrical lens 25; 1.5 mm between the cylindrical lens 25 and the cylindrical lens 26; and 2.2 mm between the center (principal plane) of the lens 27 and the cylindrical lens 26. Positions of the prisms raise no particular problem.

These optical systems were sufficiently prevented from reflection with respect to the wavelength 8500 Å of the semiconductor laser beam. As the result, it was found that the size of the optical system is sufficiently small and matches the size of the semiconductor laser and that loss is no more than 30%, which means a high efficiency. Also, the beam was approximately circular in cross-section and when condensed, it can provide a very high beam power density.

In the embodiments of FIGS. 8 and 9, the cross-sectional shape of the afocal beam from the optical system for collimating the semiconductor laser beam (the first to fifth embodiments) is changed to a predetermined cross-sectional shape by the use of an anamorphic afocal optical system, whereas the predetermined cross-sectional shape may also be provided by suitably setting the vertical and lateral focal lengths of the optical system itself for collimating the semiconductor laser beam.

Let $Q_\xi$ be the angle of vertical divergence of the beam from the semiconductor laser and $f_\xi$ be the vertical focal length of the optical system for collimating the laser beam. The vertical height a of the parallel beam from the collimating optical system, with respect to the optic axis, may be expressed as $f_\xi \sin \theta_s$. Also, let $\theta_\eta$ be the angle of lateral divergence of the laser beam and $f_\eta$ be the lateral focal length of the collimating optical system, and the lateral height b of the parallel beam will be expressed as $f_\eta \sin \theta_\eta$.

Figure 14A:
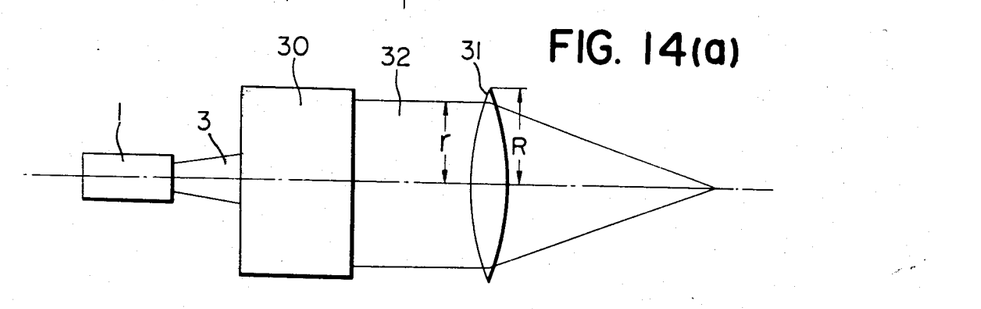
FIGS. 14(a) and 14(b) shows the optical arrangement of an eighth embodiment in which a circular spot may be obtained with a good energy efficiency.
Figure 14B:
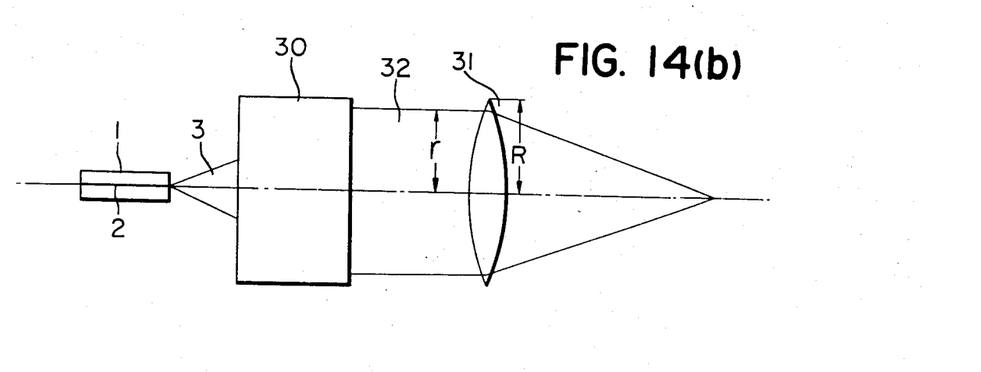

Accordingly, a parallel beam having a desired vertical-lateral width ratio may be provided by suitably setting the focal lengths $f_\xi$ and $f_\eta$. Such an embodiment is shown in FIG. 14. Thus, reference should be had to the illustration of FIG. 15.

Description will next be made of a case where the parallel beam from the optical system for collimating the semiconductor laser beam is focused by a rotation symmetry lens, namely, an optical system having equal focal lengths in the vertical and the lateral direction.

Where a parallel beam is to be focused by a rotary symmetry lens, the parallel beam should desirably be an axial rotation symmetry parallel beam. Also, where the radius of this parallel beam is r and the aperture radius of the rotation symmetry lens is R, the vicinity of $r/R = 0.9$ is desirable in energy efficiency. This will further be described below.

Figure 10:
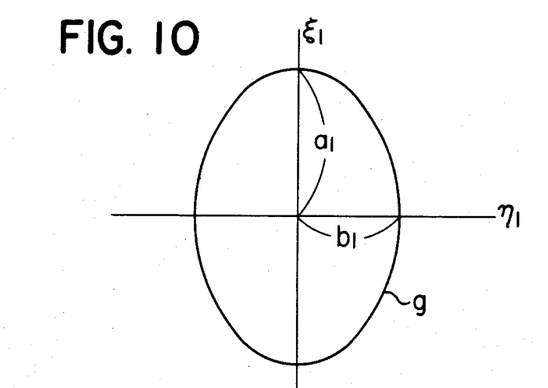
FIGS. 10, 11(a), 11(b) and 12 illustrate the distributions of intensity of the semiconductor laser beam.

The isointensity curve of the diverging beam from the semiconductor laser on the observation plane $\xi_1, \eta_1$ parallel to the exit surface of the semiconductor laser is elliptical as shown in FIG. 10. Thus, this diverging beam has a light intensity $I(\xi_1, \eta_1)$ represented by:

$$I(\xi_1, \eta_1) = I_0 \cdot \exp\left[-2\left\{\frac{\xi_1^2}{a_1^2} + \frac{\eta_1^2}{b_1^2}\right\}\right] \quad (1)$$

where $I_0$ represents the light intensity on the observation origin, and $a_1$ and $b_1$ mean the positions whereat the light intensity on the axes $\xi_1$ and $\eta_1$ becomes $1/e^2$ of the intensity on the observation origin.

If the total energy from the semiconductor laser is V, $$V = I_0 \int_{-\infty}^{\infty} \int_{-\infty}^{\infty} \exp\left[-2\left\{\frac{\xi_1^2}{a_1^2} + \frac{\eta_1^2}{b_1^2}\right\}\right] d\xi_1 \, d\eta_1 \quad (2)$$

From this equation (2), the following equation can be simply derived:

$$I_0 = \frac{2V}{\pi a_1 b_1} \quad (3)$$

This $I_0$ represents the center intensity of the diverging beam from the semiconductor laser.

Figure 11A:
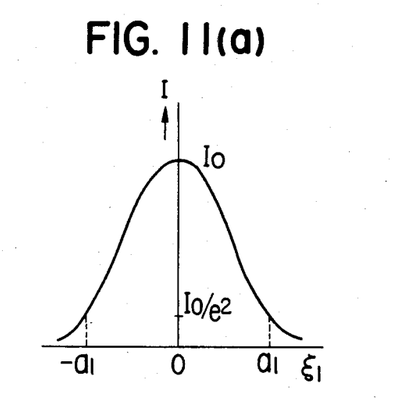
Figure 11B:
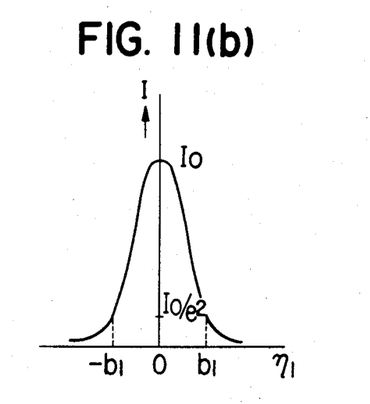

The diverging characteristic represented by equation (1) may be illustrated with respect to the directions $\xi_1$ and $\eta_1$, respectively, as shown in FIGS. 11(a) and (b).

Figure 12:
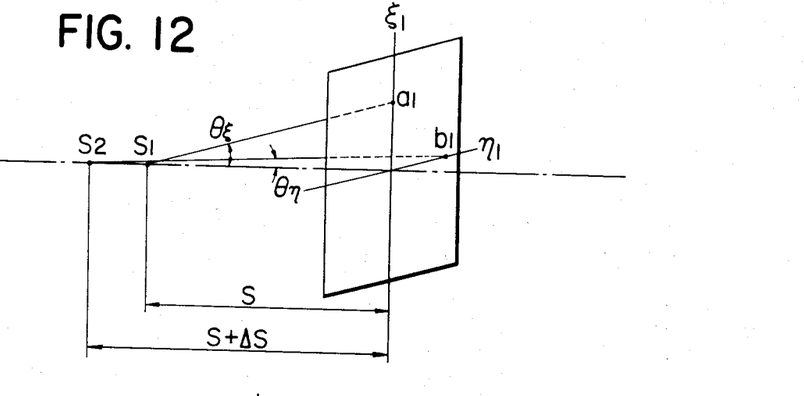

As shown in FIG. 12, let $\theta_\xi$ be the angle formed with the optic axis by the light ray beaching a point on the axis $\xi_1$ of the observation plane and lying at a distance $a_1$ from the optic axis, $\theta_\eta$ be the angle formed with the optic axis by the light ray reaching a point lying on the axis $\eta_1$ and at a distance $b_1$ from the optic axis, S be the distance from the observation plane to the origin of light emission in the direction $\xi$, and $S + \Delta S$ be the distance from the observation plane to the origin of light emission in the direction $\eta$. Then, $$\begin{cases} a_1 = S \cdot \tan \theta_\xi \\ b_1 = (S + \Delta S) \cdot \tan \theta_\eta \end{cases} \quad (4)$$

Figure 13:
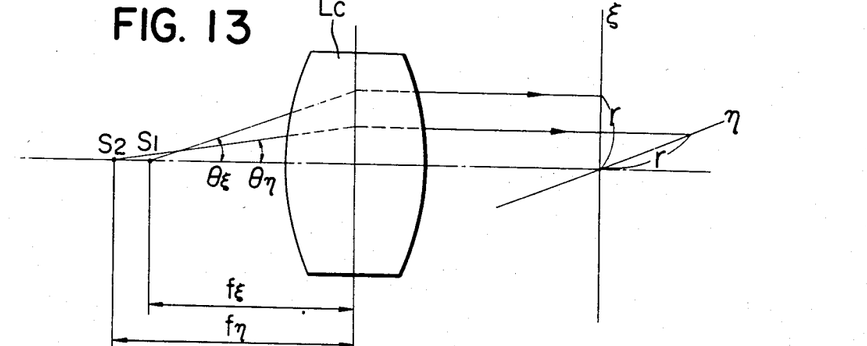
FIG. 13 illustrates an optical system in which the distributions of intensity becomes rotation symmetry.

On the other hand, let $f_\xi$ be the focal length of the condensing system $L_C$ resulting from the refracting (reflecting) action of this system in the direction $\xi$ in FIG. 13, and $f_\eta$ be the focal length of the condensing system $L_C$ resulting from the refracting (reflecting) action of this system in the direction $\eta$. By the difference between the refracting (reflecting) actions in these two directions, the beam emergent from the condensing system may be made into a parallel beam. Now, assuming that the positions whereat the intensity assumes its center $1/e^2$ in the directions $\xi$ and $\eta$ lie at distances $r_\xi$ and $r_\eta$ from the optic axis, $$r_\xi = f_\xi \sin \theta_\xi \text{ and}$$

$$r_\eta = f_\eta \sin \theta_\eta$$

In order that the distributions of intensity in the directions $\xi$ and $\eta$ may be equal, it is required that $r_\xi = r_\eta \approx r$. Thus, $$f_\xi \sin \theta_\xi = f_\eta \sin \theta_\eta \ (\approx r) \tag{5}$$

From equations (4) and (5), the following is obtained:

$$\begin{cases} f_\xi = r\sqrt{S^2 + a_1^2}/a_1 \\ f_\eta = r\sqrt{(S + \Delta S)^2 + b_1^2}/b_1 \end{cases} \tag{6}$$

Therefore, by seeking after $a_1$, $b_1$, $S$ and $\Delta S$ through measurements and by setting the r, it is possible to determine $f_\xi$ and $f_\eta$.

Setting of the r is closely related to the aperture radius R of the focusing lens. More specifically, where the cross-sectional distribution of intensity of the parallel beam emergent from the condensing system is Gaussian distribution and the position of the intensity $1/e^2$ with respect to the center intensity of said beam lies at the distance r from the optic axis, and if such beam is focused by a focusing lens having an aperture radius R, the center intensity $I_0'$ of the focused image may be expressed as:

$$I_0' = C \cdot R^2 \cdot \left[\frac{1 - e^{-R^2/r^2}}{R/r}\right]^2 \tag{7}$$

where C is constant. From equation (7), it follows that $I_0'$ becomes maximum when the value of the ratio r/R is in the vicinity of:

$$r/R = 0.892 \tag{8}$$

That is, the center intensity of the focused image can be maximized if the parallel beam emergent from the condensing system satisfies the condition that the diameter of a beam having a light intensity of $1/e^2$ or greater be rendered to 89.2% of the aperture radius of the focusing lens.

From equations (6) and (8), the following is obtained:

$$\begin{cases} f_\xi = 0.892 R\sqrt{S^2 + a_1^2}/a_1 \\ f_\eta = 0.892 R\sqrt{(S + \Delta S)^2 + b_1^2}/b_1 \end{cases} \tag{9}$$

Thus, by obtaining through measurements $a_1$, $b_1$, $S$ and $\Delta S$ which represent the light emitting characteristics of the light source and by determining the aperture radius R of the focusing lens, it is possible to obtain $f_\xi$ and $f_\eta$ which are the focal lengths of the condensing system resulting from the refracting (reflecting) actions in the directions $\xi$ and $\eta$, respectively.

FIG. 14 shows an optical system which is capable of focusing the beam from the semiconductor laser into a circular shape with a good energy efficiency. Designated by 30 is an optical system for collimating the beam from the semiconductor laser 1, and 31 a rotation symmetry lens for focusing the parallel beam from the optical system 30. The aperture radius of this lens 31 is R. The beam emergent from the optical system 30 is a parallel beam 30 of circular cross-section having a radius r. Thus, the optical system 30 may be any one of the previous embodiments. The ratio r/R is 0.892.

Figure 15:
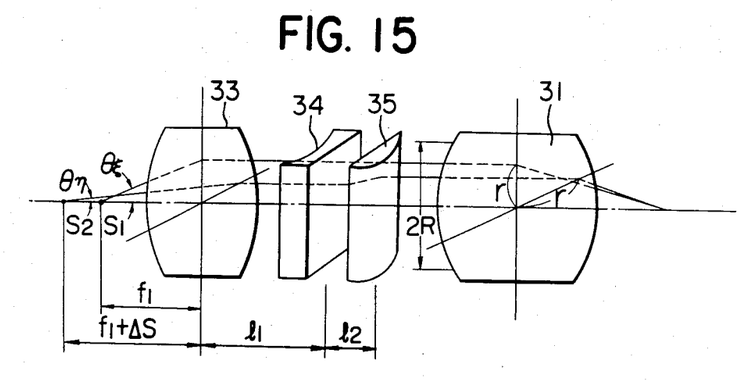
FIGS. 15 to 18 show the optical arrangements of ninth to twelfth embodiments which differ in construction and in which a circular spot may be obtained with a good energy efficiency.

FIG. 15 shows a more specific optical system than the eighth embodiment of FIG. 14. In FIG. 15, the optical system, which has been designated by 30 in FIG. 14, comprises a rotation symmetry lens 33 and concave and convex cylindrical lenses 34 and 35 whose bus lines are coincident with the vertical directions. The focal point of the rotation symmetry lens 33 is coincident with the origin of vertical divergence $S_1$. The vertical focal length $f_\xi$ and the lateral focal length $f_\eta$ of the optical system 33, 34, 35 are as shown by equation (9), that is, $$f_\xi = 0.892 R\sqrt{S^2 + a_1^2}/a_1$$

$$f_\eta = 0.892 R\sqrt{(S + \Delta S)^2 + b_1'^2}/b_1$$

The optical system having such focal lengths may be obtained in the manner described below.

First, the focal length $f_1$ of the rotation symmetry lens 33 is set. Since it is only the rotation symmetry lens 33 that determines the vertical focal length of the optical system 33, 34, 35, it is necessary that $f_1 = f_\xi$. Thus, the focal length of the rotation symmetry lens 33 is $$0.892\sqrt{S^2 + a_1^2}/a_1.$$

On the other hand, the lateral total focal length $f_\eta$ of the optical system 33, 34, 35 may be expressed as:

$$f_\eta = \frac{1}{\frac{1}{f_1} + \frac{1}{f_{34}} + \frac{1}{f_{35}} - l_1 \cdot \frac{1}{f_1}(\frac{1}{f_{34}} + \frac{1}{f_{35}}) - l_2 \frac{1}{f_{35}}(\frac{1}{f_1} + \frac{1}{f_{34}}) + l_1 \cdot l_2 \cdot \frac{1}{f_1} \cdot \frac{1}{f_{34}} \cdot \frac{1}{f_{35}}} \tag{10}$$

where $f_{34}$ represents the focal length of the concave cylindrical lens 34, $f_{35}$ the focal length of the convex cylindrical lens 35, $l_1$ the spacing between the principal points of the lens 33 and the cylindrical lens 34, and $l_2$ the spacing between the principal points of the cylindrical lenses 34 and 35.

Also, if the distance from the principal point of the rotation symmetry lens 33 to the origin of divergence $S_2$ of the light source is $f_1 + \Delta S$, the condition required for the beam emergent therefrom to be collimated is $$f_n = \cfrac{l_1 \cdot \left(\cfrac{1}{f_{34}} + \cfrac{1}{f_{35}} - l_2 \cdot \cfrac{1}{f_{34}} \cdot \cfrac{1}{f_{35}}\right) + l_2 \cdot \cfrac{1}{f_{35}}}{\cfrac{1}{f_1} + \cfrac{1}{f_{34}} + \cfrac{1}{f_{35}} - l_1 \cdot \cfrac{1}{f_1}\left(\cfrac{1}{f_{34}} + \cfrac{1}{f_{35}}\right) - l_2 \cdot \cfrac{1}{f_{35}}\left(\cfrac{1}{f_1} + \cfrac{1}{f_{34}}\right) + l_1 \cdot l_2 \cfrac{1}{f_1} \cdot \cfrac{1}{f_{34}} \cdot \cfrac{1}{f_{35}}} + f1 + \Delta S \quad (11)$$

The distance between the principal points of the cylindrical lenses 34 and 35 may be selected such that one origin of divergence $S_1$ of the light source is coincident with the focal point of the rotation symmetry lens 33 and that the other origin of divergence $S_2$ of the light source is coincident with the focal point of the composite system comprising the rotation symmetry lens 33 and the cylindrical lenses 34, 35.

Thus, from equations (10) and (11), the following may be obtained:

mined to thereby set the construction of the cylindrical system.

The distance $l_1$ between the principal points of the rotation symmetry lens 33 and the cylindrical lenses 34, 35 may be set arbitrarily.

In the manner described above, the beam emergent from the optical system 33, 34, 35 may be made into a parallel beam of substantially circular cross-sectional shape and the center intensity of the focused image may be maximized.

$$l_2 = \cfrac{1 - l_1\left(\cfrac{1}{f_{34}} + \cfrac{1}{f_{35}}\right) - (f_1 + \Delta S)\left\{\cfrac{1}{f_1} + \cfrac{1}{f_{34}} + \cfrac{1}{f_{35}} - l_1 \cdot \cfrac{1}{f_1}\left(\cfrac{1}{f_{34}} + \cfrac{1}{f_{35}}\right)\right\}}{\left\{1 - l_1 \cdot \cfrac{1}{f_{34}} - (f_1 + \Delta S)\left(\cfrac{1}{f_1} + \cfrac{1}{f_{34}} - l_1 \cdot \cfrac{1}{f_1} \cdot \cfrac{1}{f_{34}}\right)\right\}\cfrac{1}{f_{35}}} \quad (12)$$

Assuming that $\Delta S$ is small, the beam emergent from the rotation symmetry lens 33 is substantially a parallel beam and therefore, when it is desired to cause such beam to emerge while its width is being expanded to $\beta$ times by the cylindrical system, the following condition may be resorted to:

$$f_{22} = \beta f_{21} \quad (13)$$

Figure 16:
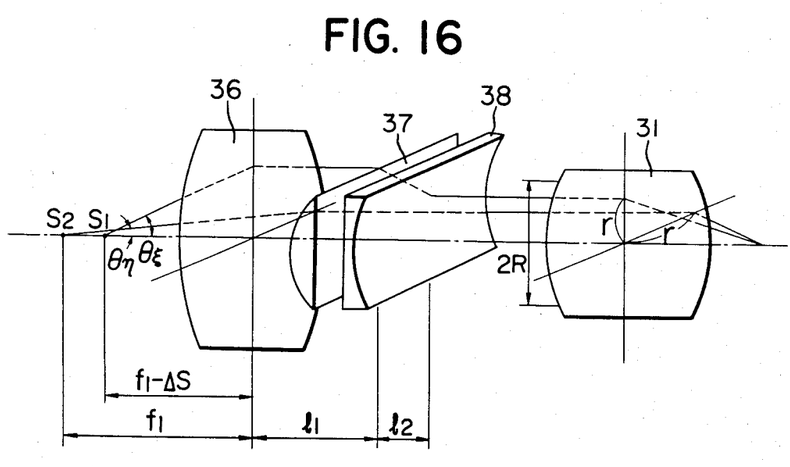

This $\beta$ is significant and, when the amount of deviation $\Delta S$ of the origin of divergence of the light source is small depending on the positions $a_1$ and $b_1$ whereat the intensity of divergence of the light source on the aforementioned observation plane becomes $1/e^2$ of the center intensity, the $\beta$ is expressed as:

$$|\beta| \simeq (a_1/b_1) \quad (a_1 > b_1) \quad (14)$$

where $\beta < 0$ when $f_{21} \cdot f_{22} < 0$ and $\beta > 0$ when $f_{21} \cdot f_{22} > 0$. Thus, the value represented by formula (14) is adopted as $\beta$, whereby the following is obtained from equations (12) and (13):

FIG. 16 shows a tenth embodiment. In FIG. 16, the optical system which has been designated by 30 in FIG. 14 comprises a rotation symmetry lens 36 and cylindrical lenses 37 and 38 whose bus lines are coincident with the lateral direction. The focal point of the rotation symmetry lens 36 is coincident with the origin of lateral divergence $S_2$. The vertical and lateral focal lengths $f_\xi$ and $f_\eta$ of the optical system 36, 37, 38 are respectively:

$$f_\xi = 0.892R\sqrt{S^2 + a_1^2/a_1}$$

$$f_\eta = 0.892R\sqrt{(S+\Delta S)^2 + b_1^2/b_1}$$

The optical system having such focal lengths may be obtained in the manner described below.

First, the focal length of the rotation symmetry lens 36 is set. Since it is only the rotation symmetry lens that determines the lateral focal length of this optical system 36, 37, 38, it is necessary that $f_1 = f_\eta$. Thus, the focal length of the rotation symmetry lens 36 is $0.892R\sqrt{S^2 + b_1^2/b_1}$.

On the other hand, the vertical total focal length $f_\xi$ of $$l_2 = \cfrac{1 - \cfrac{l_1}{f_{34}}\left(1 + \cfrac{1}{\beta}\right) - (f_1 + \Delta S)\left\{\cfrac{1}{f_1} + \cfrac{1}{f_{34}}\left(1 + \cfrac{1}{\beta}\right) - \cfrac{l_1}{f_1 f_{34}}\left(1 + \cfrac{1}{\beta}\right)\right\}}{\left[1 - \cfrac{l_1}{f_{34}} - (f_1 + \Delta S)\left\{\cfrac{1}{f_1} + \cfrac{1}{\beta f_{34}} - \cfrac{l_1}{f_1 f_{34}}\right\}\right]\cfrac{1}{\beta f_{34}}} \quad (15)$$

On the other hand, the following equation is given by equations (9) and (10) which are the conditions for maximizing the center intensity of the focused image:

this optical system 36, 37, 38 may be expressed as:

$$f_\xi = \cfrac{1}{\cfrac{1}{f_1} + \cfrac{1}{f_{37}} + \cfrac{1}{f_{38}} - l_1 \cdot \cfrac{1}{f_1}\left(\cfrac{1}{f_{37}} + \cfrac{1}{f_{38}}\right) - l_2 \cdot \cfrac{1}{f_{38}}\left(\cfrac{1}{f_1} + \cfrac{1}{f_{37}}\right) + l_1 \cdot l_2 \cdot \cfrac{1}{f_1} \cdot \cfrac{1}{f_{37}} \cdot \cfrac{1}{f_{38}}} \quad (18)$$

where $f_{37}$ represents the focal length of the convex cylindrical lens 37, $f_{38}$ the focal length of the concave $$l_2 = \cfrac{\cfrac{1}{f_1} + \cfrac{1}{f_{21}}\left(1 + \cfrac{1}{\beta}\right) - \cfrac{l_1}{f_1 f_{21}}\left(1 + \cfrac{1}{\beta}\right) - \cfrac{0.892 R \sqrt{(S + \Delta S)^2 + b_1^2}}{b_1}}{\cfrac{1}{\beta f_{21}}\left(\cfrac{1}{f_1} + \cfrac{1}{f_{21}}\right) - \cfrac{l_1}{\beta f_1 \cdot f_{21}^2}} \quad (16)$$

Consequently, $f_{21}$ and $l_2$ can be determined by equations (15) and (16). Further, by equation (13), $f_{22}$ can be determined to thereby set the construction of the cylindrical cylindrical lens 38, $l_1$ the spacing between the principal points of the lens 36 and the cylindrical lens 37, and $l_2$ the spacing between the principal points of the cylindrical lenses 37 and 38.

Also, if the distance from the principal point of the rotation symmetry lens 36 to the origin of divergence $S_1$ of the light source is $f_1 - \Delta S$, the condition for the beam emergent from such lens to be collimated is:

$$f_\xi = \frac{l_1 \cdot (\frac{1}{f_{37}} + \frac{1}{f_{38}} - l_2 \cdot \frac{1}{f_{37}} \cdot \frac{1}{f_{38}}) + l_2 \cdot \frac{1}{f_{38}}}{\frac{1}{f_1} + \frac{1}{f_{37}} + \frac{1}{f_{38}} - l_1 \cdot \frac{1}{f_1}(\frac{1}{f_{37}} + \frac{1}{f_{38}}) - l_2 \cdot \frac{1}{f_{38}}(\frac{1}{f_1} + \frac{1}{f_{37}}) + l_1 \cdot l_2 \cdot \frac{1}{f_1} \cdot \frac{1}{f_{37}} \cdot \frac{1}{f_{38}}} + f_1 - \Delta S \quad (19)$$

From equations (18) and (19), there is obtained a result which is entirely identical to the result of equation (12) with the only exception that in the distance $l_2$ between the principal points of the cylindrical lenses 37 and 38, $\Delta S$ is substituted for by $-\Delta S$. Assuming that $\Delta S$ is so small that the beam emergent from the rotation symmetry system is substantially a parallel beam, and when it is desired to cause this beam to emerge while its beam width is being reduced to $\beta$ times by the cylindrical system, it is only required that $$f_{22} = \beta f_{21} \quad (20)$$

Conversely to the case of FIG. 15, the $\beta$ is expressed as:

$$|\beta| \approx (b_1/a_1)(a_1 b_1) \quad (21)$$

where $\beta < 0$ when $f_{37} \cdot f_{38} < 0$ and $\beta > 0$ when $f_{37} \cdot f_{38} > 0$.

By doing so, $l_2$ can be expressed by an equation entirely identical to equation (15) with the only exception that $\Delta S$ is substituted for by $-\Delta S$. On the other hand, from the equations (9) and (18) for maximizing the center intensity of the focused image, the following is obtained:

$$l_2 = \frac{\frac{1}{f_1} + \frac{1}{f_{21}}(1 + \frac{1}{\beta}) - \frac{l_1}{f_1 f_{21}}(1 + \frac{1}{\beta}) - \frac{0.892 R \sqrt{S^2 + a_1^2}}{a_1}}{\frac{1}{\beta f_{21}}(\frac{1}{f_1} + \frac{1}{f_{21}}) - \frac{l_1}{\beta f_1 \cdot f_{21}^2}} \quad (22)$$

Thus, $f_{21}$ and $l_2$ can be determined by equations (15) and (22). Further, from equation (20), $f_{22}$ can be determined to set the construction of the cylindrical system.

Again in this case, $l_1$ may be set arbitrarily as in the case of FIG. 15. In the manner described above, the beam emergent from the condensing system can be made into a parallel beam of substantially circular cross-section and the center intensity of the focused image can be substantially maximized.

The difference between the ninth embodiment of FIG. 15 and the tenth embodiment of FIG. 16 is the difference in focal length between their rotation symmetry systems, as will be seen from equations (17) and (23). More specifically, where $b_1 < a_1$, the focal length of the rotation symmetry system is greater in the ninth embodiment than in the tenth embodiment and this leads to an advantage that a greater differential distance can be secured between the rotation symmetry system and the light source. For example, in practice, there is such selectivity that if the system of the tenth embodiment is chosen to set the condensing optical system with a result that the differential distance of the rotation symmetry system thereof is too small, the system of the ninth embodiment is available to adopt.

Figure 17:
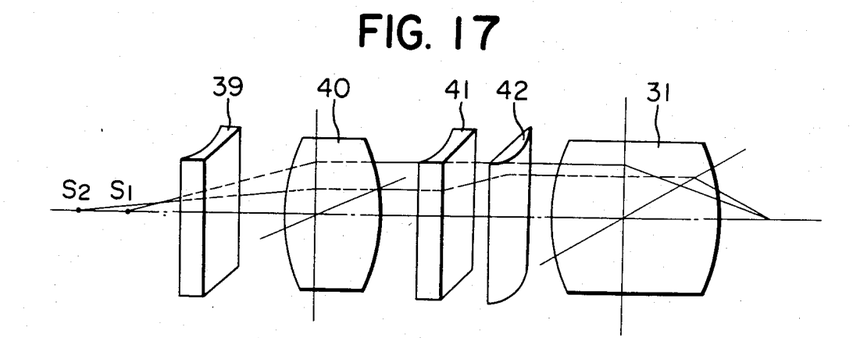
Figure 18:
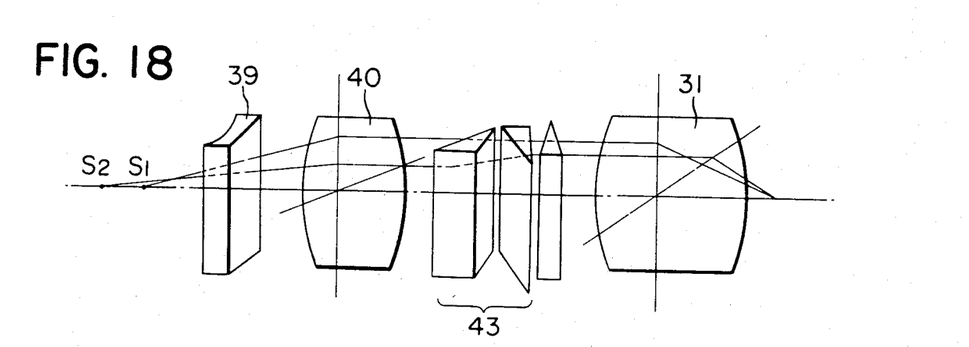

FIG. 17 shows an eleventh embodiment of the present invention. Designated by 39 is a concave cylindrical lens whose bus line is coincident with the vertical direction. By this cylindrical lens 39, the origin of lateral divergence $S_2$ is made coincident with the origin of vertical divergence $S_1$. Designated by 40 is a rotation symmetry lens whose focal point is coincident with the origin of vertical divergence $S_1$. By this lens 40, the beam from the semiconductor laser is collimated with respect both to the vertical and the lateral direction. The vertical height of the parallel beam from the lens 40 with respect to the optic axis is 0.892R. However, the lateral height of said parallel beam with respect to the optic axis is lower than 0.892R. Therefore, the parallel beam from the lens 40 is expanded by a cylindrical anamorphic afocal optical system 41, 42, with respect only to the lateral direction, so that the lateral height becomes 0.892R. In the present embodiment, a cylindrical anamorphic afocal optical system is shown to be reed as the system for the lateral expansion of the beam, whereas a prism anamorphic afocal optical system 43 may also be employed as shown in FIG. 18.

Figure 19:
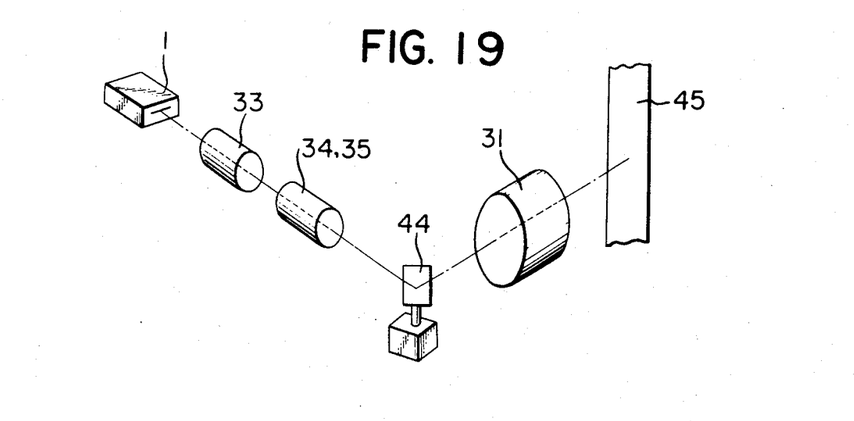
FIG. 19 shows the optical system of the present invention as applied to a scanning apparatus.

FIG. 19 shows an application of the ninth embodiment of the present invention to a scanning system. Designated by 44 is a deflector for scanning a parallel beam, and 45 a recording medium which effects auxiliary scanning in a direction perpendicular to the scanning direction to thereby accomplish image recording.

Any of the semiconductor lasers hitherto described has different origins of divergence and different angles of divergence in the vertical and the lateral direction, whereas there are semiconductor lasers having the same origin of divergence but different angles of divergence in the vertical and the lateral direction.

Figure 20A:
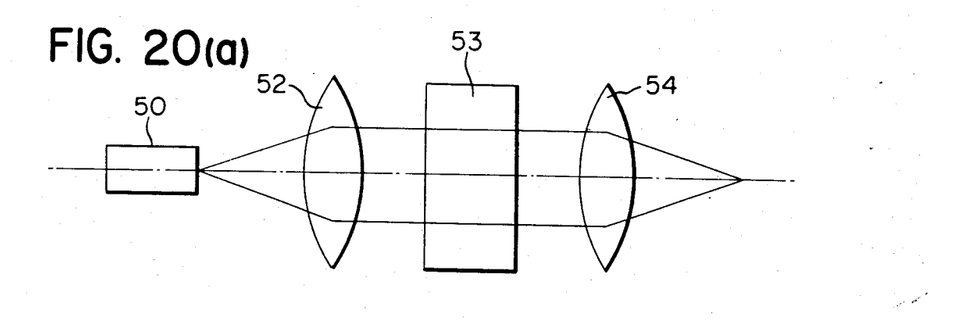
FIGS. 20(a) and 20(b) shows the arrangement of an optical system in which a beam from a semiconductor laser having equal origins of emission but having different angles of divergence in directions orthogonal to each other may be efficiently made into a circular spot.
Figure 20B:
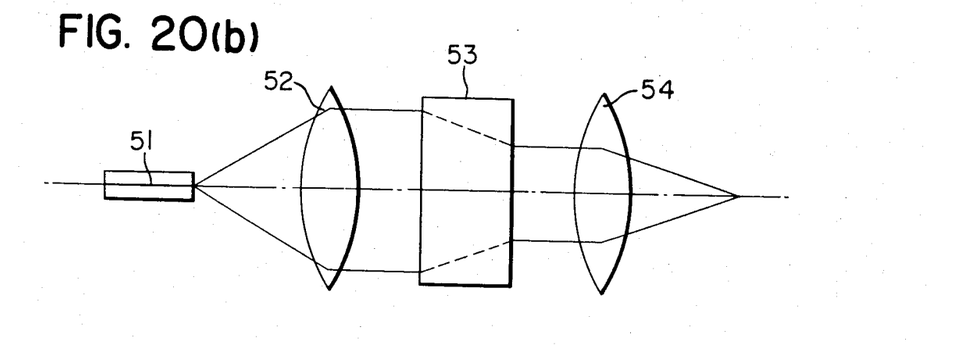

A fourteenth embodiment as shown in FIG. 20 is an optical system for efficiently focusing the beam from such a semiconductor laser into a circular spot. Designated by 50 is a semiconductor laser in which origins of vertical and lateral divergence both lie on the exit surface of the laser and the angle of vertical divergence is greater than the angle of lateral divergence. Denoted by 51 is the joining surface of the laser. Numeral 52 designates a rotation symmetry lens for collimating the beam from the exit surface of the semiconductor laser 50, and 53 an anamorphic afocal optical system. This anamorphic afocal optical system may be either a prism anamorphic afocal system or a cylindrical anamorphic afocal system. By this anamorphic afocal system, the afocal beam from the collimating optical system 52 is expanded or reduced with respect only to one direction. In the drawing, the vertical beam diameter is shown to be reduced. By suitably selecting the focal length of the rotation symmetry lens 52 and the magnification of the afocal system, it is possible to obtain a parallel beam of circular cross-section hving a diameter of 0.892R with respect to the radius R of the rotation symmetry focusing lens 54. Where the optical system of this embodiment is to be applied to the apparatus of FIG. 19, the arrangement may be made such that a deflecting mirror 44 is disposed between the afocal system 53 and the focusing lens 54.

I claim:

1. A beam shaping optical system for collimating the beam from a semiconductor laser, comprising:
   a semiconductor laser element, the origin of divergence of the beam from the exit surface of said element in a direction parallel to the joining surface of said element lying at a position on a certain axis remote from said exit surface, the origin of divergence of said beam in a direction perpendicular to said joining surface lying at a position on said certain axis adjacent said exit surface; and
   an optical system having different focal lengths in directions orthogonal to each other, the optic axis of said optical system being coincident with said certain axis, said focal lengths being coincident with said origins of divergence, respectively.

2. A beam shaping optical system according to claim 1, wherein said optical system having different focal lengths in directions orthogonal to each other includes at least one cylindrical system.

3. A beam shaping optical system for collimating the beam from a semiconductor laser, comprising:
   a semiconductor laser element, the origin of divergence of the beam from the exit surface of said element in a direction parallel to the joining surface of said element lying at a position on a certain axis remote from said exit surface, the origin of divergence of said beam in a direction perpendicular to said joining surface lying at a position on said certain axis adjacent said exit surface;
   a cylindrical system whose bus line is coincident with one of the direction parallel to said joining surface and the direction perpendicular to said joining surface, said cylindrical system causing the origin of divergence of the beam diverging in the direction perpendicular to said bus line to be coincident with the other origin of divergence; and
   a rotation symmetry lens system whose focal point is coincident with said other origin of divergence.

4. A beam shaping optical system according to claim 3, wherein the bus line of said cylindrical system is coincident with the direction parallel to said joining surface, said cylindrical system causes the origin of divergence in the direction perpendicular to said joining surface to be coincident with the origin of divergence in the direction parallel to said joining surface, and the focal point of said rotation symmetry lens system is coincident with said origin of divergence in the direction parallel to said joining surface.

5. A beam shaping optical system according to claim 4, wherein said cylindrical system is a convex cylindrical lens system.

6. A beam shaping optical system according to claim 3, wherein the bus line of said cylindrical system is coincident with the direction perpendicular to said joining surface, said cylindrical system causes the origin of divergence in the direction perpendicular to said joining surface to be coincident with the origin of divergence in the direction perpendicular to said joining surface, and the focal point of said rotation symmetry lens is coincident with the origin of divergence in the direction perpendicular to said joining surface.

7. A beam shaping optical system according to claim 6, wherein said cylindrical system is a concave cylindrical lens system.

8. A beam shaping optical system for collimating the beam from a semiconductor laser, comprising:
   a semiconductor laser element, the origin of divergence of the beam from the exit surface of said element in a direction parallel to the joining surface of said element lying at a position on a certain axis remote from said exit surface, the origin of divergence of said beam in a direction perpendicular to said joining surface lying at a position on said certain axis adjacent said exit surface;
   a first cylindrical system whose bus line is coincident with the direction parallel to said joining surface, said first cylindrical system causing the origin of divergence in the direction perpendicular to said joining surface to be moved to a certain point on said certain axis;
   a second cylindrical system whose bus line is coincident with the direction perpendicular to said joining surface, said second cylindrical system causing the origin of divergence in the direction parallel to said joining surface to be moved to said certain point on said certain axis; and
   a rotation symmetry lens system whose focal point is coincident with said certain point on said certain axis.

9. A beam shaping optical system according to claim 8, wherein said first cylindrical system is a convex cylindrical lens system and said second cylindrical system is a concave cylindrical lens system.

10. A beam shaping optical system according to claim 8, wherein said certain point on said certain axis is a midpoint between the origin of divergence in said parallel direction and the origin of divergence in said perpendicular direction.

11. A beam shaping optical system for collimating the beam from a semiconductor laser, comprising:
    a semiconductor laser element, the origin of divergence of the beam from the exit surface of said element in a direction parallel to the joining surface of said element lying at a position on a certain axis remote from said exit surface, the origin of divergence of said beam in a direction perpendicular to said joining surface lying at a position on said certain axis adjacent said exit surface;
    a rotation symmetry lens whose focal point is coincident with one of said origins of divergence; and
    a cylindrical system for receiving the beam from said rotation symmetry lens, the bus line of said cylindrical system being coincident with a direction perpendicular to the direction of divergence from the other origin of divergence, the composite focal point of said rotation symmetry lens and said cylindrical system being coincident with said other origin of divergence.

12. A beam shaping optical system according to claim 11, wherein said one origin of divergence is the origin of divergence in the direction perpendicular to said joining surface, and the bus line of said cylindrical system is coincident with the direction parallel to said joining surface.

13. A beam shaping optical system according to claim 11, wherein said one origin of divergence is the origin of divergence in the direction parallel to said joining surface, and the bus line of said cylindrical system is coincident with the direction perpendicular to said joining surface.

14. A beam shaping optical system for making the beam from a semiconductor laser into a parallel beam of a predetermined cross-sectional shape, comprising:
 a semiconductor laser element, the origin of divergence of the beam from the exit surface of said element in a direction parallel to the joining surface of said element lying at a position on a certain axis remote from said exit surface, the origin of divergence of said beam in a direction perpendicular to said joining surface lying at a position on said certain axis adjacent said exit surface;
 an optical system having different focal lengths in directions orthogonal to each other, the optical axis of said optical system being coincident with said certain axis, said focal lengths being coincident with said origins of divergence, respectively; and
 an anamorphic afocal optical system for receiving the beam from said optical system having different focal lengths in directions orthogonal to each other.

15. A beam shaping optical system according to claim 14, wherein said anamorphic afocal optical system is a prism anamorphic afocal optical system.

16. A beam shaping optical system according to claim 14, wherein said anamorphic afocal optical system is a cylindrical anamorphic afocal optical system.

17. A beam shaping optical system for making the beam from a semiconductor laser into a circular spot, comprising:
 a semiconductor laser element, the origin of divergence of the beam from the exit surface of said element in a direction parallel to the joining surface of said element lying at a position on a certain axis remote from said exit surface, the origin of divergence of said beam in a direction perpendicular to said joining surface lying at a position on said certain axis adjacent said exit surface;
 a collimating optical system for making the beam from said semiconductor laser element into a rotation symmetry parallel beam, said collimating optical system having different focal lengths in directions orthogonal to each other and having respective focal points coincident with said origins of divergence, respectively; and
 a rotation symmetry lens for receiving the rotation symmetry parallel beam from said collimating optical system to make said parallel beam into a circular spot.

18. A beam shaping optical system according to claim 17, wherein said collimating optical system includes an anamorphic afocal optical system.

19. A beam shaping optical system according to claim 17, wherein said collimating optical system is designed such that the beam emergent therefrom is substantially 0.9R in diameter, the R being the aperture radius of sid rotation symmetry lens.

20. A beam shaping optical system according to claim 17, further comprising a deflecting surface disposed between said collimating optical system and said rotation symmetry lens.

21. A beam shaping optical system for making the beam from a semiconductor laser into a circular spot, comprising:
 a semiconductor laser element, the beam from the exit surface of said element having its angle of divergence differing between a direction parallel to the joining surface of said element and a direction perpendicular to the joining surface of said element;
 a collimating optical system for collimating the beam from said exit surface of said semiconductor laser element;
 an anamorphic afocal optical system for making the cross-section of the parallel beam from said collimating optical system into a circular shape; and
 a rotation symmetry lens for focusing the beam from said anamorphic afocal optical system.

22. A beam shaping optical system according to claim 21, wherein said collimating optical system is designed such that the beam emergent therefrom is substantially 0.9R in diameter, the R being the aperture radius of said rotation symmetry lens.

23. A beam shaping optical system according to claim 21, further comprising a deflecting surface disposed between said collimating optical system and said rotation symmetry lens.

* * * * *

Disclaimer 4,203,652.—*Hiroshi Hanada*, Yokohama, Japan BEAM SHAPING OPTICAL SYSTEM. Patent dated May 20, 1980. Disclaimer filed Aug. 28, 1981, by the assignee, *Canon Kabushiki Kaisha.*

Hereby enters this disclaimer to claims 1, 2, 17 and 18 of said patent.

[*Official Gazette October 20, 1981.*]